US011683608B2

(12) United States Patent
Lim

(10) Patent No.: US 11,683,608 B2
(45) Date of Patent: Jun. 20, 2023

(54) METHOD AND IMAGE SENSOR DEVICE CAPABLE OF PREDICTING APPROPRIATE LENGTH OF EXPOSURE TIME INTERVAL FOR INCOMING FRAME(S)

(71) Applicant: PixArt Imaging Inc., Hsin-Chu (TW)

(72) Inventor: Wooi Kip Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/364,903

(22) Filed: Jul. 1, 2021

(65) Prior Publication Data

US 2023/0007201 A1 Jan. 5, 2023

(51) Int. Cl.
*H04N 25/75* (2023.01)
*H04N 23/73* (2023.01)
*H04N 25/77* (2023.01)

(52) U.S. Cl.
CPC ............. *H04N 25/75* (2023.01); *H04N 23/73* (2023.01); *H04N 25/77* (2023.01)

(58) Field of Classification Search
CPC ..... H04N 5/378; H04N 5/2353; H04N 5/3745
See application file for complete search history.

(56) References Cited

U.S. PATENT DOCUMENTS 6,175,383 B1 * 1/2001 Yadid-Pecht ........ H04N 5/3535 348/297
2011/0216233 A1 * 9/2011 Bock ................. H01L 27/14641 348/294

* cited by examiner

*Primary Examiner* — Nicholas G Giles
(74) *Attorney, Agent, or Firm* — Winston Hsu

(57) ABSTRACT

An image sensor device includes a sensor array and a processing circuit. The sensor array includes a plurality of pixel units each including a photodiode unit and a storage capacitor. The sensor array generates an image of a specific frame, and the photodiode unit is illuminated by a light ray to generate a photodiode current which is stored in the storage capacitor when the image sensor device performs an exposure operation. The processing circuit generates a reference current according to photodiode current(s) of photodiode unit(s) of pixel unit(s) before the exposure operation arranged for the specific frame starts, and predicts a length of an exposure time interval of the exposure operation for the specific frame based on the generated reference current.

18 Claims, 4 Drawing Sheets

METHOD AND IMAGE SENSOR DEVICE CAPABLE OF PREDICTING APPROPRIATE LENGTH OF EXPOSURE TIME INTERVAL FOR INCOMING FRAME(S)

BACKGROUND OF THE INVENTION

1. Field of the Invention

The invention relates to an image sensing mechanism, and more particularly to an image sensor device and corresponding method.

2. Description of the Prior Art

Generally speaking, a conventional image sensor device may estimate an appropriate exposure time interval after many frames have been sensed by the conventional image sensor device. It is not efficient. Further, when operating at a low frame rate, the conventional image sensor device may frequently move from a surface position to another different surface position corresponding to a different light condition. That is, before the number of sensed frames becomes enough to estimate an appropriate exposure time interval, the light condition have been changed. Thus, the conventional image sensor device when operating at the low frame rate may frequently suffer the problem of significantly changed light conditions.

SUMMARY OF THE INVENTION

Therefore one of the objectives of the invention is to provide an image sensor device and corresponding method to solve the above-mentioned problems.

According to embodiments of the invention, an image sensor device is disclosed. The device comprises a sensor array and a processing circuit. The sensor array comprises a plurality of pixel units and each pixel unit comprises g a photodiode unit and a storage capacitor. The sensor array is used for generating an image of a specific frame, and the photodiode unit is illuminated by a light ray to generate a photodiode current which is stored in the storage capacitor when the image sensor device performs an exposure operation. The processing circuit is coupled to the sensor array, and it is used for generating a reference current according to at least one photodiode current of at least one photodiode unit of at least one pixel unit before the exposure operation arranged for the specific frame starts, and then for predicting a length of an exposure time interval of the exposure operation for the specific frame based on the generated reference current.

According to embodiments of the invention, a method of an image sensor device is further disclosed. The method comprises: providing a sensor array which comprises a plurality of pixel units each comprising a photodiode unit and a storage capacitor; using the sensor array to generate an image of a specific frame, the photodiode unit being illuminated by a light ray to generate a photodiode current which is stored in the storage capacitor when the image sensor device performs an exposure operation; generating a reference current according to at least one photodiode current of at least one photodiode unit of at least one pixel unit before the exposure operation arranged for the specific frame starts; and, predicting a length of an exposure time interval of the exposure operation for the specific frame based on the generated reference current.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an image sensor device capable of predicting or estimating a length of an appropriate exposure time interval (i.e. shutter exposure turn-on period) of an exposure operation for specific frame(s) such as next or incoming frame(s). The technical solution can be suitable for a global shutter mode and a rolling shutter mode. For instance, the sensor may operate at a low frame rate such as a rate lower than 100 Hz in order to save more power (reduce power consumption) and can also know how long the shutter exposure turn-on period should be adjusted.

Figure 1:
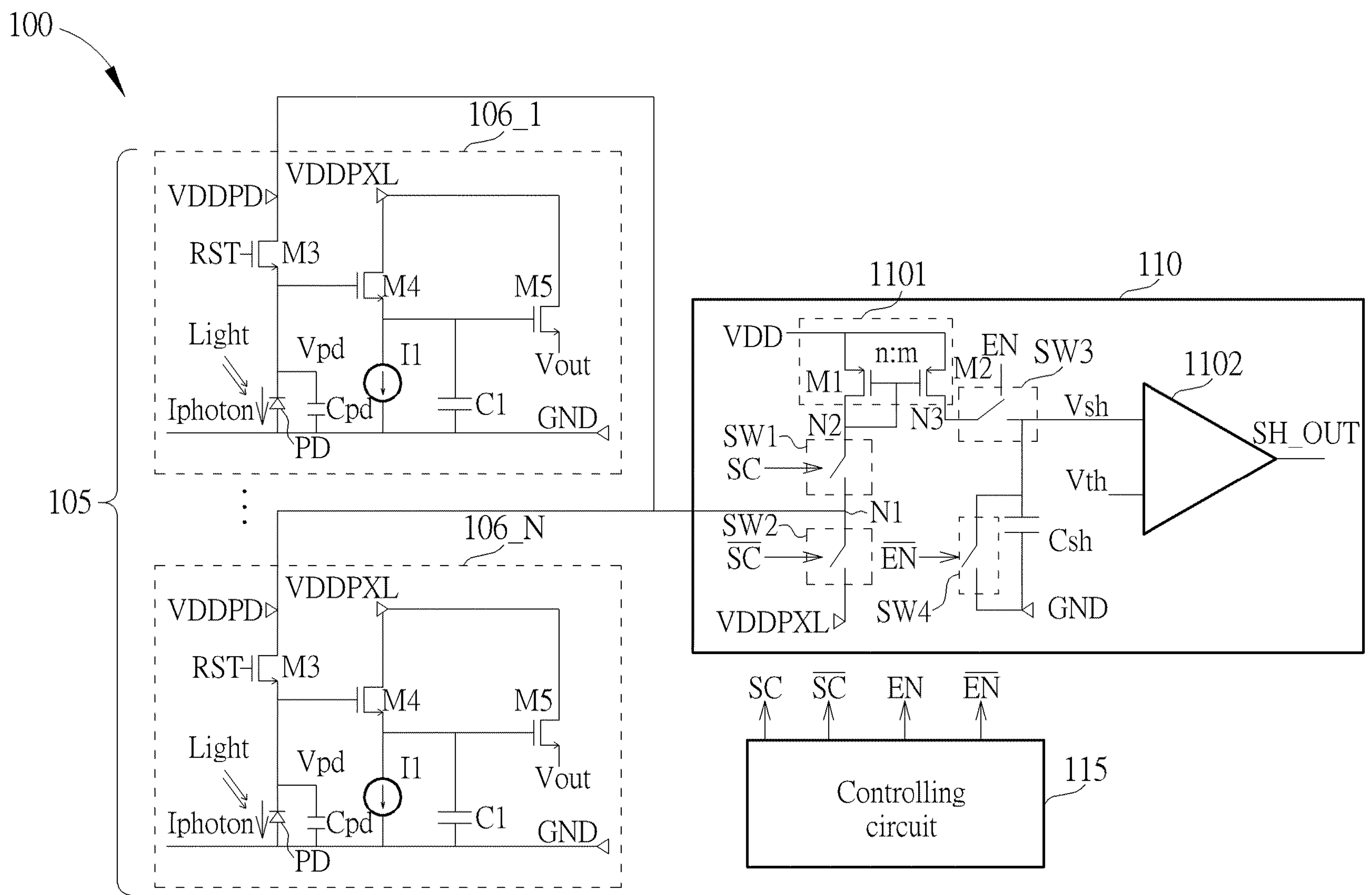
FIG. 1 is a block diagram of an image sensor device according to an embodiment of the invention.

FIG. 1 is a block diagram of an image sensor device 100 according to an embodiment of the invention. The image sensor device 100 comprises a sensor array 105, a processing circuit 110, and a controlling circuit 115. The processing circuit 110 is coupled to the sensor array 105, a reference voltage level such as a photodiode supply voltage level VDDPD, a reference voltage level such as a pixel supply voltage level VDDPXL, and a ground level GND, and it comprises a current mirror circuit 1101, a reference capacitor (or can be referred to as sample/hold capacitor) Csh, a comparator 1102, and four switch units SW1-SW4 which are controlled by the controlling circuit 115 as shown in FIG. 1. The current mirror circuit 1101 is formed by two transistor circuits M1 and M2. Each of the transistor circuits M1 and M2 can comprise one or more PNP or NPN transistors (but not limited).

The sensor array 105 is used for generating image (s) of frame(s) and comprises a plurality of pixel units such as N pixel units 106_1-106_N, and each pixel unit 106_1-106_N respectively comprises a photodiode unit PD and a storage capacitor Cpd. Further, each pixel unit 106_1-106_N respectively further comprises a reset transistor M3, a source follower transistor M4, a read transfer capacitor C1, and a read transfer transistor M5. The photodiode unit PD is illuminated by a light ray to generate a photodiode current which is stored in the storage capacitor Cpd when the image sensor device 100 performs an exposure operation.

The processing circuit 110 is used for generating a reference current according to photodiode current(s) of photodiode unit(s) PD of pixel unit(s) before the exposure operation, which is used for a specific frame (next or incoming frame), starts. The processing circuit 110 then is used for predicting a length of an appropriate exposure time interval of the exposure operation for the specific frame based on the generated reference current.

For the circuit structure of each pixel unit 106_1-106_N, the reset transistor M3 has a first terminal coupled to the photodiode supply voltage level VDDPD, a second terminal coupled to the photodiode PD, and a control terminal controlled by and coupled to a reset signal RST. The photodiode PD is coupled between the ground level GND and the second terminal of the reset transistor M3. The storage capacitor Cpd is also coupled between the ground level GND and the second terminal of the reset transistor M3.

During a shutter turn-on period, a photodiode current Iphoton is generated due to the light emission, and a voltage Vpd is generated at a terminal of the storage capacitor Cpd. The source follower transistor M4 has a first terminal coupled to a pixel supply voltage level VDDPXL, a second terminal coupled to a current source I1, and a control terminal coupled to the voltage Vpd, so that the source follower transistor M4 can pass the voltage Vpd to its second terminal. The current source I1 is coupled to the read transfer capacitor C1 by parallel. The read transfer transistor M5 has a first terminal coupled to the pixel supply voltage level VDDPXL, a second terminal, and a control terminal coupled to the second terminal of the source follower transistor M4 to receive the voltage Vpd. The output voltage Vout is accordingly generated at the second terminal of the read transfer transistor M5 and can be read out.

For the processing circuit 110, the sizes of transistor M1 and M2 in the current mirror circuit 1101 are respectively associated with the sizes n and m, as indicated by the mirror ratio "n:m" as shown in FIG. 1. For example (but not limited), the transistor M1 may be implemented by using n transistors connected in parallel while the transistor M2 may be implemented by using m transistors connected in parallel. The current mirror circuit 1101 is used to generate a mirrored current at the output node N3 as the above-mentioned reference current based on the current at the input node N2. For instance, the amount of the mirrored current at the output node N3 is equivalent to that of the current at the input node N2 multiplied by m/n wherein the values of m and n are adjustable.

The switch unit SW1 is selectively coupled between the current mirror circuit 1101 (i.e. the node N2) and the node N1 of the processing circuit 110. The switch unit SW2 is selectively coupled between the pixel supply voltage level VDDPXL and the node N1 of the processing circuit 110. The switch unit SW3 is selectively coupled between a first terminal of the reference capacitor Csh and the output node N3 of the current mirror circuit 1101. The switch unit SW4 is selectively coupled between the first terminal of the reference capacitor Csh and the ground level GND. The reference capacitor Csh has the first terminal and a second terminal which is coupled to the ground level GND.

The comparator 1102 has a first input terminal coupled to the first terminal of the reference capacitor Csh, a second input terminal coupled to the threshold voltage Vth, and an output terminal for generating and outputting the output signal SH_OUT as a shutter output signal which is used for determining the length of the exposure time interval. The controlling circuit 115 comprised by the processing circuit 110 is used for generating four control signals SC, $\overline{SC}$, EN, $\overline{EN}$ to respectively control the ON/OFF states of the switch units SW1, SW2, SW3, SW4. The control signal $\overline{SC}$ is an inverse signal of the control signal SC, and the control signal $\overline{EN}$ is an inverse signal of the control signal EN.

In practice, in this embodiment (but not limited), the photodiode supply voltage levels VDDPD of the total pixel units 106_1-106_N of the sensor array 105 are respectively coupled to the node N1. The processing circuit 110 is arranged to generate the mirrored current according to the amounts of all pixel units' photodiode currents caused by emissions of light rays (i.e. the summation of all the pixel units' photodiode currents) when all the pixel units are exposed to the light rays, and then determine the length of the exposure time interval according to the mirrored current. It should be noted that, in other embodiments, the processing circuit 110 may generate the mirrored current according to a portion of one or more pixel units' photodiode currents. This modification also obeys the spirits of the invention.

Figure 2:
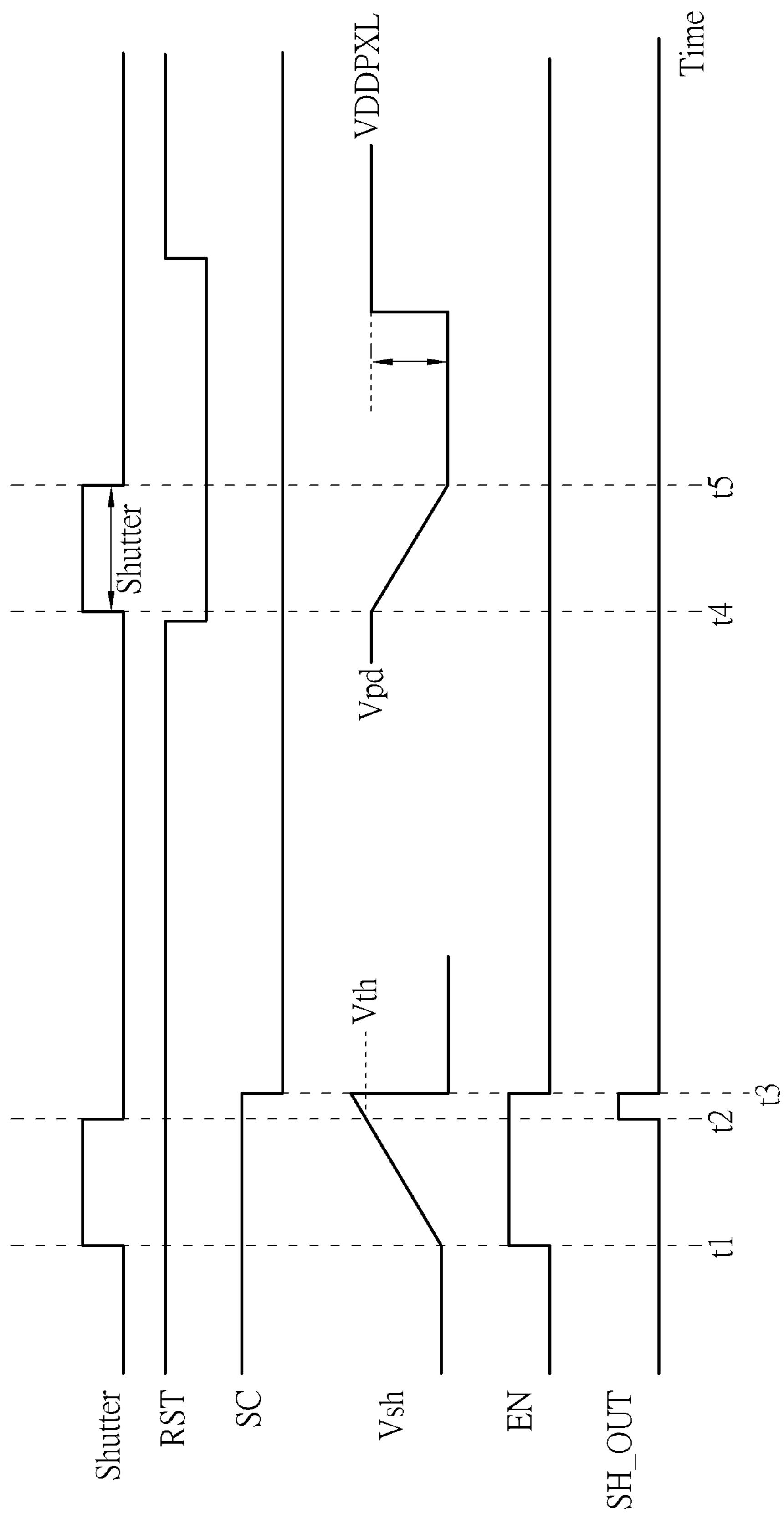
FIG. 2 is a diagram showing an example of the signal waveforms of the predicted length of exposure time interval, reset control signal RST, voltage Vsh, control signal EN, and output signal SH_OUT.

FIG. 2 is a diagram showing an example of the signal waveforms of the predicted length of exposure time interval, reset control signal RST, voltage Vsh, control signal EN, and output signal SH_OUT. As shown in FIG. 2, before timing t1, the reset control signal RST is at a high logic level, and the control signal SC is also at the high logic level while the control signal $\overline{SC}$ is at a low logic level correspondingly. In this situation, the switch unit SW1 is at the OFF state (i.e. closed), and the switch unit SW2 is at the ON state (i.e. open), so that the photodiode supply voltage level VDDPD of each pixel unit 106_1-106_N is disconnected from the pixel supply voltage level VDDPXL. In addition, the control signal EN is at the low logic level while the control signal $\overline{EN}$ is at the high logic level, and the current mirror circuit 1101 is disconnected from the comparator 1102 and the reference capacitor Csh since the switch unit SW3 is at the ON state (i.e. open). The switch unit SW4 is at the OFF state (i.e. closed), and the voltage levels at the two terminals of the reference capacitor Csh are connected to the ground level GND. In this situation, the current mirror circuit 1101 does not generate a mirrored current at the node N3.

At the timing t1, the control signal EN is switched from the low logic level to the high logic level so that the switch unit SW3 becomes closed and the switch unit SW4 becomes open. The current mirror circuit 1101 begins to mirror the current at the node N2 to generate and output the mirrored current at the node N3 according to the mirror ratio. The voltage level at the first terminal of the reference capacitor Csh, i.e. the sample and hold voltage Vsh, gradually increases since the mirrored current charges the reference capacitor Csh (i.e. a sample and hold capacitor).

The comparator 1102 is arranged to compare the sample and hold voltage Vsh with the threshold voltage Vth to generate and output the output signal SH_OUT. The level of the output signal SH_OUT is at the low logic level when the sample and hold voltage Vsh is smaller than the threshold voltage Vth, and the level of the output signal SH_OUT is at the high logic level when the sample and hold voltage Vsh becomes larger than the threshold voltage Vth.

For example, at timing t2, the sample and hold voltage Vsh becomes larger than the threshold voltage Vth, and a rising edge occurs in the output signal SH_OUT. At timing t3, the reset charge operation is not completed when the reset control signal RST is kept at the high logic level, and the control signal SC is switched from the high logic level to the low logic level so that the switch unit SW1 becomes open and the switch unit SW2 becomes closed. In this situation, the photodiode supply voltage levels VDDPD of each pixel unit is connected to the pixel supply voltage level VDDPXL via the switch unit SW2. In addition, the control signal EN at the timing t3 is also switched from the high logic level to the low logic level, and the switch unit SW3 becomes open and the switch unit SW4 becomes closed. In this situation, the charge at the first terminal of the reference capacitor Csh is discharged to the ground level GND, and the sample and hold voltage level Vsh is instantly pulled down to zero as shown in FIG. 2. Since the sample and hold voltage level Vsh becomes zero at the timing t3, a falling edge occurs in the output signal SH_OUT to make the output signal SH_OUT be switched from the high logic level to the low logic level.

It should be noted that in this embodiment a predicted length of the shutter time period is determined by the processing circuit based on the rising edge of the control signal EN and the rising edge of the output signal SH_OUT, as shown in FIG. 2. That is, the end of the predicted length of the exposure time interval is determined based on a timing of the signal level change of the shutter output signal SH_OUT. After obtaining the predicted length of the shutter time period, the image sensor device enters a shutter mode (e.g. global shutter mode or rolling shutter mode) during the time interval between the timings t4 and t5 wherein the length of the time interval is determined by and equivalent to the length of the predicted shutter time period.

According to the estimated or predicted exposure time interval, the voltage Vpd can gradually decrease from the pixel supply voltage VDDPXL to a lower voltage level during the predicted and appropriate exposure time interval between timings t4 and t5, and the charge corresponding to the voltage difference between the voltages at timings t4 and t5 indicates the charge signal to be read out.

Further, in other embodiments, the mirror ratio can be adjusted or can be modified.

Figure 3:
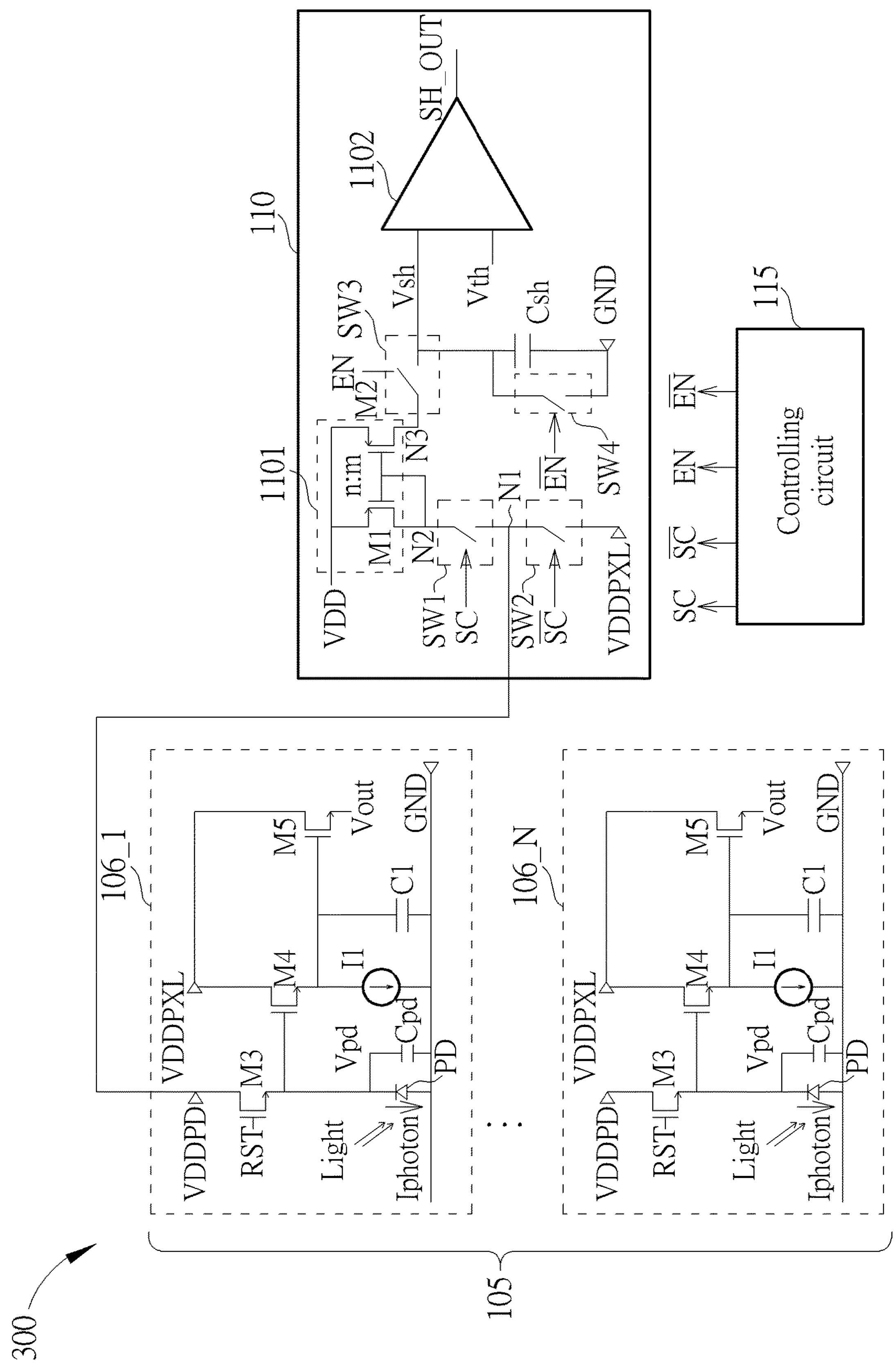
FIG. 3 is a diagram showing an example of an image sensor device according to another embodiment of the invention.

Further, in other embodiments, the current mirror circuit 1101 can be arranged to sample and hold and mirror the charging currents of one or multiple pixel units among all the pixel units 1601_1-1601_N to predict the length of the exposure time interval for the next frame(s). For example, FIG. 3 is a diagram showing an example of an image sensor device 300 according to another embodiment of the invention. As shown in FIG. 3, the node N1 is connected to the photodiode supply voltage level VDDPD of merely one or more pixel units rather than all the pixel units. The detailed description is not described for brevity.

Further, the position(s) of one or more pixel units having the photodiode supply voltage levels VDDPD connected to the node N1 of the processing circuit 110 may be configured or disposed at any positions within a whole frame/image. This is not meant to be a limitation of the invention.

Further, the prediction operation of estimating the appropriate exposure time interval of a next incoming frame can be performed during the exposure time interval of a previous/current frame and/or can be performed at the timing between two exposure time intervals. These modifications also fall within the scope of the invention.

By doing so, the image sensor device can dynamically adjust the length of the exposure time interval according to the environment light condition, so that the image sensor device can be used and applied in different light conditions. In a preferred embodiment, the appropriate exposure time interval of a next incoming frame can be correctly predicted based on only one previous or current frame.

Figure 4:
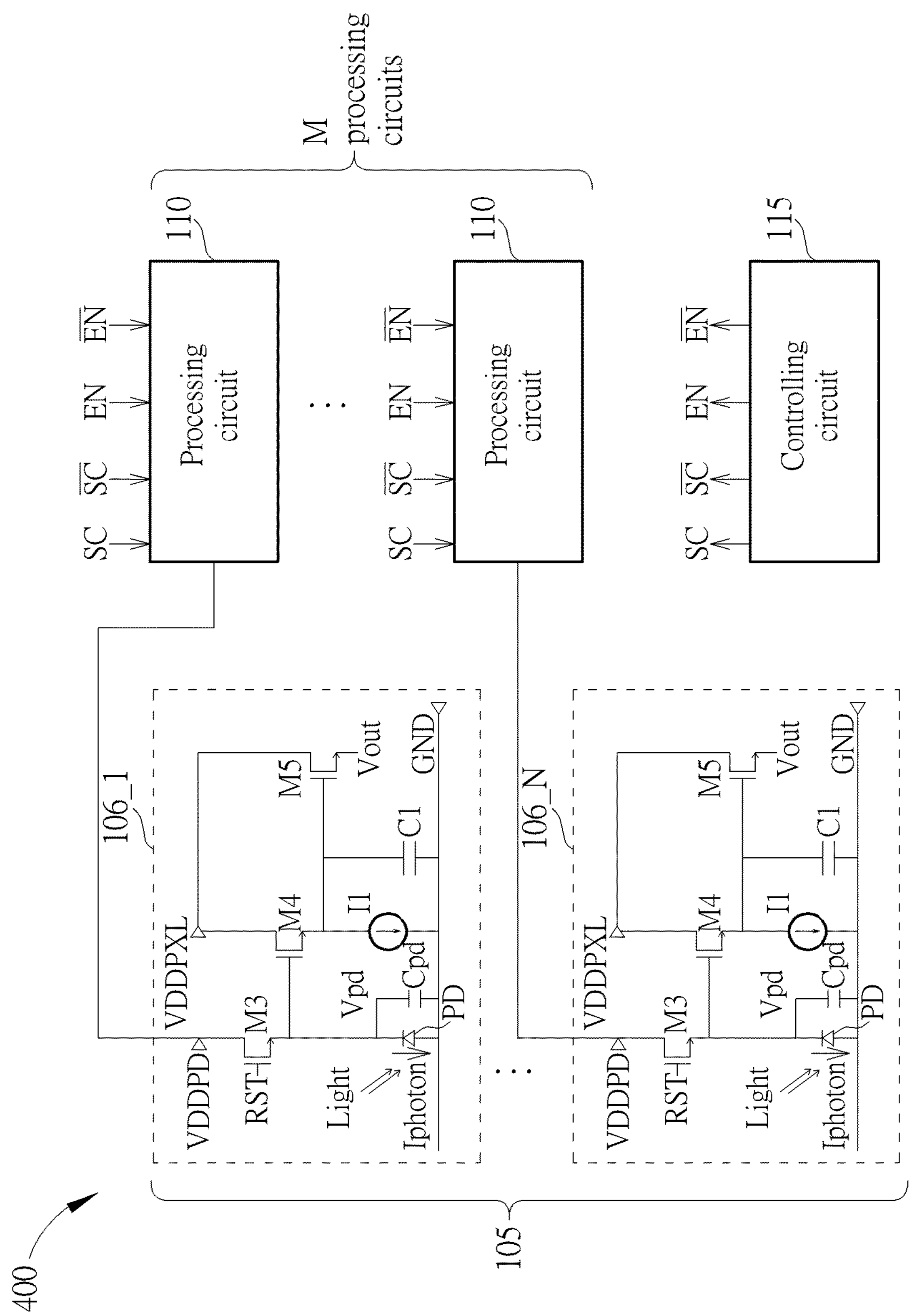
FIG. 4 is a block diagram of an image sensor device according to one embodiment of the invention.

Further, in other embodiments, an image sensor device may comprise multiple processing circuits mentioned above which may be respectively associated with multiple pixel units in the sensor array or may be associated with all pixel units in the sensor array. FIG. 4 is a block diagram of an image sensor device 400 according to one embodiment of the invention. As shown in FIG. 4, the image sensor device 400 comprises the sensor array 105, the controlling circuit 115, and M multiple sets of processing circuits 110. The value of M can be equal to or smaller than the value of N. In this embodiment, each processing circuit 110 receives the different control signals generated from the controlling circuit 115. For example, if the values of M and N are equal, then this indicates that each processing circuit 110 is coupled to one corresponding pixel unit disposed in the sensor array 105. In this situation, each processing circuit 110 is arranged to generate a mirrored current according to the amount of a corresponding pixel unit's photodiode current caused by emission of light ray when the corresponding pixel unit is exposed to the light ray, and then it can determine the length of the exposure time interval according to the mirrored current. Actually, since different pixel units may be exposed to different emissions of light rays (but not limited), the amounts of mirrored currents of the different pixel units may be different, and the lengths of the exposure time intervals determined based on the different mirrored currents may be different. In this embodiment, the controlling circuit 115 can select a specific exposure time interval from the exposure time intervals having different lengths as a resultant exposure time interval for incoming frame(s), and for example the selected specific exposure time interval may be the exposure time interval having a maximum length, a minimum length, a median length, or an average length calculated from the different lengths. After determining the resultant exposure time interval, the controlling circuit 115 can be further arranged to finely adjust/calibrate the resultant exposure time interval.

In other embodiments, the value of M may be smaller than the value of N, i.e. the number of processing circuits may be less than the number of total pixel units in the sensor array 105. That is, each processing circuit is arranged to generate a mirrored current corresponding to a portion of pixel units. Other descriptions are not described again for brevity.

The value of mirror ratio n:m, the capacitance of the reference capacitor Csh, and the level of the threshold voltage Vth can be adjusted in different embodiments. For example, an initial level of the threshold voltage Vth may be configured based on the setting of the full scale range of the analog-to-digital converter (ADC) in the comparator 1102, and for example the initial level may be equal to 400 mV (but not limited) when the full scale voltage is equal to 800 mV (but not limited). The level of the threshold voltage Vth then can be dynamically adjusted based on different light conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor device, comprising:

a sensor array, comprising a plurality of pixel units each comprising a photodiode unit and a storage capacitor; for generating an image of a specific frame, the photodiode unit is illuminated by a light ray to generate a photodiode current which is stored in the storage capacitor when the image sensor device performs an exposure operation; and a processing circuit, coupled to the sensor array, for generating a reference current in response to an amount of at least one photodiode current of at least one photodiode unit of at least one pixel unit when the at least one photodiode unit is exposed and before the exposure operation arranged for the specific frame starts, and then for predicting a length of an exposure time interval of the exposure operation for the specific frame based on the generated reference current;

wherein the processing circuit comprises a current gain circuit which is arranged for generating the reference current based on a current gain value according to a portion or a summation of the at least one photodiode current of the at least one photodiode unit, and the processing circuit is arranged for generating a shutter output signal which is used for determining the length of the exposure time interval.

2. The image sensor device of claim 1, wherein the current gain circuit comprises:

a current mirror circuit with a mirror gain, having a first terminal selectively coupled to the at least one pixel unit and a second terminal selectively coupled to a reference capacitor, configured for generating the reference current based on the mirror gain according to the portion or the summation of the at least one photodiode current of the at least one photodiode unit; and the processing circuit further comprises:

the reference capacitor, coupled between the current mirror and a ground level, to be charged by the reference current; and a comparator, having a first input terminal selectively coupled to the second terminal of the current mirror, a second input terminal coupled to a threshold voltage, and an output terminal for generating the shutter output signal which is used for determining the length of the exposure time interval.

3. The image sensor device of claim 2, wherein an end of the length of the exposure time interval is determined based on a timing of a signal level change of the shutter output signal.

4. The image sensor device of claim 2, wherein each pixel unit among the at least one pixel unit further comprises a first switch unit which is selectively coupled between a first voltage level and a second voltage level; the first voltage level is coupled to a first terminal of a reset transistor of the each pixel unit, and the second voltage level is coupled to a source follower transistor of the each pixel unit wherein the source follower transistor has a control terminal coupled to a second terminal of the reset transistor; when the image sensor device predicts the length of the exposure time interval, the first switch unit is open to separate the first voltage level from the second voltage level.

5. The image sensor device of claim 4, wherein the processing circuit further comprises a second switch unit which is selectively disposed between the first terminal of the current mirror circuit and the first terminal of the reset transistor of the each pixel unit in the at least one pixel unit; when the image sensor device predicts the length of the exposure time interval, the second switch unit is closed to make the first voltage level be connected to the current mirror circuit, and the reference current is generated from the second terminal of the current mirror circuit to charge the reference capacitor.

6. The image sensor device of claim 5, wherein a signal level change occurs in the shutter output signal generated at the output terminal of the comparator when a voltage at a first terminal of the reference capacitor increases and then becomes higher than the threshold voltage.

7. The image sensor device of claim 5, wherein the processing circuit further comprises a third switch unit selectively coupled between the current mirror circuit and the reference capacitor; a start of the length of the exposure time interval is determined when the third switch unit becomes closed to make the generated reference current charge the reference capacitor.

8. The image sensor device of claim 7, wherein the processing circuit further comprises a fourth switch unit which is selectively coupled between two terminals of the reference capacitor; a charge energy at the reference capacitor is cleared when the fourth switch unit is closed.

9. The image sensor device of claim 2, wherein a capacitance of the reference capacitor, a value of the mirror gain, and a level of the threshold voltage are adjustable.

10. A method of an image sensor device, comprising:

providing a sensor array which comprises a plurality of pixel units each comprising a photodiode unit and a storage capacitor;

using the sensor array to generate an image of a specific frame, the photodiode unit being illuminated by a light ray to generate a photodiode current which is stored in the storage capacitor when the image sensor device performs an exposure operation;

generating a reference current in response to an amount of at least one photodiode current of at least one photodiode unit of at least one pixel unit when the at least one photodiode unit is exposed and before the exposure operation arranged for the specific frame starts; and predicting a length of an exposure time interval of the exposure operation for the specific frame based on the generated reference current;

wherein the generating step comprises:

using a current gain circuit to generate the reference current based on a current gain value according to a portion or a summation of the at least one photodiode current of the at least one photodiode unit; and generating a shutter output signal which is used for determining the length of the exposure time interval.

11. The method of claim 10, wherein the step of using the current gain circuit comprises:

using a current mirror circuit with a mirror gain having a first terminal selectively coupled to the at least one pixel unit and a second terminal selectively coupled to a reference capacitor to generate the reference current based on the mirror gain according to the portion or the summation of the at least one photodiode current of the at least one photodiode unit.

12. The method of claim 11, wherein an end of the length of the exposure time interval is determined based on a timing of a signal level change of the shutter output signal.

13. The method of claim 11, wherein each pixel unit among the at least one pixel unit further comprises a first switch unit which is selectively coupled between a first voltage level and a second voltage level; the first voltage level is coupled to a first terminal of a reset transistor of the each pixel unit, and the second voltage level is coupled to a source follower transistor of the each pixel unit wherein the source follower transistor has a control terminal coupled to a second terminal of the reset transistor; when the image sensor device operates under a shutter prediction mode, the first switch unit is open to separate the first voltage level from the second voltage level.

14. The method of claim 13, wherein a second switch unit is selectively disposed between the first terminal of the current mirror circuit and the first terminal of the reset transistor of the each pixel unit in the at least one pixel unit; when the image sensor device predicts the length of the exposure time interval, the second switch unit is closed to make the first voltage level be connected to the current mirror circuit, and the reference current is generated from the second terminal of the current mirror circuit to charge the reference capacitor.

15. The method of claim 14, wherein a signal level change occurs in the shutter output signal generated at an output terminal of a comparator when a voltage at a first terminal of the reference capacitor increases and then becomes higher than a threshold voltage.

16. The method of claim 14, wherein a third switch unit is selectively coupled between the current mirror circuit and the reference capacitor; a start of the length of the exposure time interval is determined when the third switch unit becomes closed to make the generated reference current charge the reference capacitor.

17. The method of claim 16, wherein a fourth switch unit is selectively coupled between two terminals of the reference capacitor; a charge energy at the reference capacitor is cleared when the fourth switch unit is closed.

18. The method of claim 11, wherein a capacitance of the reference capacitor, a value of the mirror gain, and a level of a threshold voltage are adjustable.

* * * * *